(12) United States Patent
Uskela

(10) Patent No.: US 7,170,872 B2
(45) Date of Patent: Jan. 30, 2007

(54) RESERVING QUALITY OF SERVICE IN WIRELESS TELECOMMUNICATION SYSTEM

(75) Inventor: Sami Uskela, Helsinki (FI)

(73) Assignee: Nokia Corporation, Espoo (FI)

( * ) Notice: Subject to any disclaimer, the term of this patent is extended or adjusted under 35 U.S.C. 154(b) by 998 days.

(21) Appl. No.: 10/201,628

(22) Filed: Jul. 24, 2002

(65) Prior Publication Data

US 2003/0026232 A1 Feb. 6, 2003

Related U.S. Application Data

(63) Continuation of application No. PCT/FI01/00057, filed on Jan. 23, 2001.

(30) Foreign Application Priority Data

Jan. 24, 2000 (FI) .................................. 20000138

(51) Int. Cl.
*H04Q 7/00* (2006.01)
(52) U.S. Cl. .................................. 370/332; 370/395.21
(58) Field of Classification Search ................ 370/310, 370/310.2, 328, 332, 338, 349, 395.21, 329, 370/322, 351; 455/527, 166.2, 161.3
See application file for complete search history.

(56) References Cited

U.S. PATENT DOCUMENTS

| | | |
|---|---|---|
| 6,058,113 A | 5/2000 | Chang |
| 6,101,549 A | 8/2000 | Baugher et al. |
| 6,473,419 B1 * | 10/2002 | Gray et al. .................. 370/349 |
| 7,079,526 B1 * | 7/2006 | Wipliez et al. .............. 370/352 |

FOREIGN PATENT DOCUMENTS

| | | |
|---|---|---|
| EP | 946 008 | 9/1999 |
| WO | WO 99/50999 | 10/1999 |
| WO | WO 00/13436 | 3/2000 |

OTHER PUBLICATIONS

R. Braden et al., Resource ReSerVation Protocol (RSVP), Version I Functional Specification, RFC 2205 Standards Track, pp. 1-100, (Sep. 1997).

* cited by examiner

*Primary Examiner*—Brenda Pham
(74) *Attorney, Agent, or Firm*—Pillsbury Winthrop Shaw Pittman LLP

(57) ABSTRACT

A method for reserving quality of service (QoS) in a wireless telecommunication system, which comprises at least one mobile station, a support node serving the mobile station, and a data terminal communicating with the mobile station. QoS is reserved and maintained by transmitting path messages and reservation messages between QoS protocol entities of the mobile station and the data terminal. When reserving QoS, data at least on the first path and reservation messages is stored in the mobile station and the support node. The mobile station and the support node drop, on the basis of the stored data, the next messages corresponding to the first path and reservation messages to be transmitted between the mobile station and the data terminal. The mobile station and the support node transmit messages corresponding to the first path and reservation messages periodically to the QoS protocol entities of the mobile station and the data terminal on the basis of the stored data.

12 Claims, 4 Drawing Sheets

RESERVING QUALITY OF SERVICE IN WIRELESS TELECOMMUNICATION SYSTEM

This is a Continuation Application of International Application No. PCT/FI01/00057, which was filed on Jan. 23, 2001, and which designated the U.S., and was filed in the English language.

BACKGROUND OF THE INVENTION

The invention relates to reserving quality of service in wireless telecommunication systems.

The Quality of Service (QoS) determines how data, such as packet data units (PDU), are processed in a telecommunication system during transmission. QoS levels determined for different connections control for example the order in which PDUs of different connections are transmitted, buffered (PDU queues) and rejected in various network elements. Therefore different QoS levels represent for example various end-to-end delays, bit rates and numbers of lost PDUs.

RSVP (Resource Reservation Protocol) is a well-known protocol for reserving quality of service required by any application in IP (Internet Protocol) networks. RSVP is used by a host to request specific quality of service from the network for particular application data flows. RSVP is also used by routers to deliver QoS requests to all nodes along the path(s) of the flows and to establish and maintain a suitable network resources for providing the requested service. RSVP carries the request through the IP network, visiting each node the network uses to carry the flow. At each node, RSVP attempts to make a resource reservation for the flow.

RSVP requests resources for simplex flows, i.e. it requests resources in only one direction. Therefore, RSVP treats a sender as logically distinct from a receiver, although the same application process may act as both a sender and a receiver at the same time. RSVP operates on top of IPv4 or IPv6, occupying the place of a transport protocol in the protocol stack. However, RSVP does not transport application data.

To make a resource reservation at a node, two local decision modules, admission control and policy control, are used. Admission control determines whether the node has sufficient available resources to supply the requested QoS. Policy control determines whether the user has administrative permission to make the reservation. If either check fails, the RSVP protocol entity sends an error notification to the application process that originated the request. If both checks succeed, parameters in a packet classifier and a packet scheduler are adjusted to obtain the desired QoS. The packet classifier determines the QoS class for each packet and the scheduler orders packet transmission to achieve the promised QoS for each flow.

There are two fundamental RSVP message types: path messages PATH and reservation messages RESV. Each RSVP sender host transmits RSVP "Path" messages downstream along the unicast or multicast routes provided by the routing protocol(s), following the paths of the data. These path messages store "path state" in each node along the way. This path state includes at least the unicast IP address of the previous hop node, which is used to route the RESV messages hop-by-hop in the reverse direction.

Each receiver host sends RSVP reservation (RESV) messages upstream towards the senders. These RESV reservation messages must follow exactly the reverse of the path(s) the data packets will use, i.e. they are sent upstream to all the sender hosts included in the sender selection. They create and maintain a "reservation state" in each node along the path(s). RESV messages must finally be delivered to the sender hosts themselves, so that the hosts can set up appropriate traffic control parameters for the first hop.

RSVP requires refreshment messages to be transmitted periodically from end to end. Refreshment messages include path messages PATH and reservation messages RESV. An IETF (Internet Engineering Task Force) specification for RSVP, RFC2205 (Request for Comments: 2205), recommends a refreshment interval of 30 seconds, but each node can independently adjust the refreshment interval.

However, in wireless telecommunication systems, such as GPRS (General Packet Radio Service) networks providing a packet radio service, the bandwidth is a rather limited resource. Periodic refreshment required by the RSVP is uneconomical for the use of the radio resources.

BRIEF DESCRIPTION OF THE INVENTION

An object of the invention is to provide a method and equipment implementing the method, such that quality of service can be reserved in a wireless telecommunication system by consuming radio resources as little as possible. The objects of the invention are achieved by means of a method, a system, a mobile station and a support node of a wireless telecommunication system which are characterized by what is disclosed in the independent claims. The preferred embodiments of the invention are disclosed in the dependent claims.

The basic idea of the invention is that path and reservation messages transmitted periodically in order to maintain the quality of service reservation are not forwarded between a mobile station and a support node serving the mobile station. When quality of service is to be reserved, first path and reservation messages are transmitted between a mobile station and a data terminal communicating with the mobile station. Data at least on the first path and reservation messages is stored in the mobile station and in the support node. When receiving subsequent path or reservation messages, it is checked whether data on the first path and reservation messages of the same flow is already stored. If such data is stored, the next path and reservation messages are dropped, which means that they are not transmitted from the support node to the mobile station, or vice versa. In order to maintain the QoS reservation state, messages corresponding to the first path and reservation messages are transmitted periodically to the QoS protocol entities of the mobile station and the data terminal on the basis of the stored data. The operation proceeds in this manner whenever path and reservation messages are received until the reservation is cancelled.

According to a preferred embodiment of the invention, a timer is activated in the mobile station and in the support node when the first messages are stored, and messages corresponding to the first path and reservation messages are transmitted periodically to the QoS reservation applications on the basis of the timer.

An advantage of the method and the system according to the invention is that critical radio interface resources can be saved considerably. The existing QoS protocols can be utilized, and the required new functionality only concerns the mobile station and the support node. According to a preferred embodiment of the invention, the support node and the mobile station independently transmit messages corresponding to the stored path and reservation messages to the QoS protocol entities. As a result, no radio resources are required in transmitting periodic path and reservation messages in order to maintain the QoS reservation.

BRIEF DESCRIPTION OF THE FIGURES

The invention will be described below in greater detail by means of preferred embodiments with reference to the accompanying drawings, in which.

DETAILED DESCRIPTION OF THE INVENTION

In the following, a preferred embodiment of the invention will be described by using the functions and structure of the GSM/GPRS system as an example, but the invention can also be applied to other mobile communication systems providing means for reserving QoS.

Figure 1:
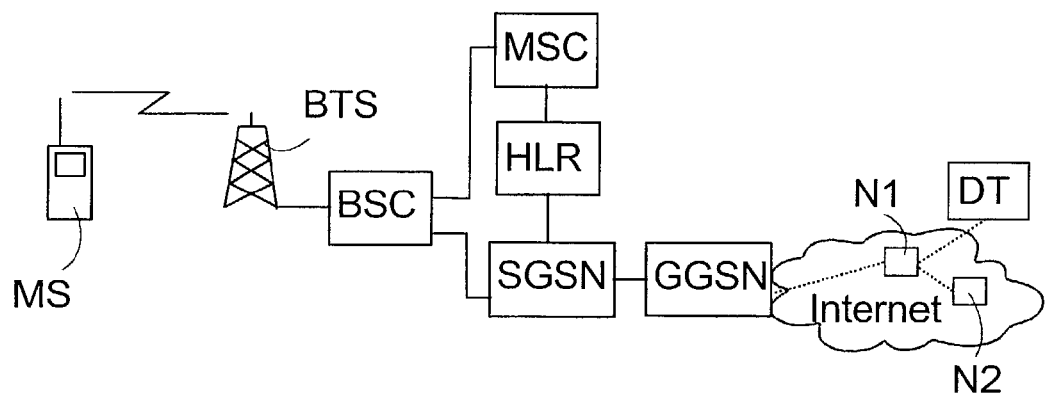
FIG. 1 shows a wireless telecommunication system comprising GPRS functionality.

FIG. 1 describes the basic components of the GSM/GPRS system without illustrating their features or other components of the system in greater detail. A mobile station MS is located in a cell served by a base station BTS. The MS comprises a removable SIM application (Subscriber Identity Module) to identify the subscriber. A number of base stations BTS are connected to a base station controller BSC, which controls the radio frequencies and channels. Base station controllers BSC are connected to a mobile services switching centre MSC.

In FIG. 1, the GPRS system connected to the GSM network comprises one serving GPRS support node SGSN and one GPRS gateway support node GGSN. The different SGSNs and GGSNs are interconnected by a GPRS backbone network, which is typically based on IP protocol.

The SGSN is connected to the BSC and is the service access point to the GPRS network for the GPRS mobile station MS. The SGSN also handles the authentication of GPRS mobile stations. If the authentication is successful, the SGSN registers the MS at the GPRS network and takes care of its mobility management. The home location register HLR comprises GPRS subscriber data and routing information and is typically also used by the MSC.

In order to send and receive GPRS data, the MS shall activate the packet data address that it wants to use by requesting a PDP (Packet Data Protocol) activation procedure. This operation makes the MS known in the corresponding GGSN, and interworking with external data networks can commence. More particularly, a PDP context is created in the MS, the GGSN and the SGSN. The PDP context defines different data transmission parameters, such as the PDP type (typically IP), PDP address (typically an IP address), quality of service QoS and Network Service Access Point Identifier (NSAPI). The MS activates the PDP context with a specific message, Activate PDP Context Request, in which it gives information on the Temporary Logical Link Identity (TLLI), PDP type, PDP address, required QoS and NSAPI, and optionally the Access Point Name APN. The MS may have multiple PDP contexts active with different QoS parameters.

Currently, five QoS parameters may be used in GPRS: service precedence, delay class, reliability, and mean and peak bit rates. 'Service precedence' defines some kind of priority for the packets belonging to a certain PDP context (i.e. which packets will be dropped in case of congestion). 'Delay class' defines mean and maximum delays for the transfer of each data packet belonging to that context. 'Reliability' in turn specifies whether acknowledged or unacknowledged services will be used at LLC (Logical Link Control) and RLC (Radio Link Control) layers. In addition, it specifies whether protected mode should be used in case of unacknowledged service, and whether the GPRS backbone should use TCP or UDP to transfer data packets belonging to the PDP context.

The GGSN is connected to the Internet. N1 and N2 are Internet nodes and DT is a data terminal also connected to the Internet. From the external networks' point of view the GGSN is a router to a subnetwork, because the GGSN hides the GPRS infrastructure from the external networks. When the GGSN receives data addressed to a GPRS subscriber, it checks if a PDP context is active for the subscriber. If so, the GGSN forwards the data to the SGSN serving the MS, but if the address is inactive, the data may be discarded or a network-originated PDP context is activated. The mobile-originated packets are routed to the Internet by the GGSN.

As the PDP context is active, RSVP may be used to reserve QoS between the MS and the DT. Depending on which one is the originator of the data delivery, PATH messages are sent through every node (hop-by-hop) between RSVP protocol entities of the MS and the DT (GGSN, N1), the PATH messages defining the packet format and the traffic characteristics of the data flow that will be generated. When the PATH messages are received, the receiver sends RESV messages, which are used to reserve the required QoS. When the QoS is reserved by RSVP, the QoS parameters are mapped to appropriate GPRS QoS parameters and network resources are reserved for the connection accordingly. In case of uplink (Mobile-Originated, MO) data, the MS may already request for a PDP context with the QoS fulfilling the application needs. Similarly, for downlink data (Mobile-Terminated d, MT), the GGSN should translate the QoS information from the RSVP messages into the GPRS QoS parameters.

If the activated PDP context is inappropriate for the QoS requirements requested by the RSVP protocol entity, the mobile station MS may modify the existing PDP context or initiate another PDP context to better satisfy the requested QoS.

Figure 2:
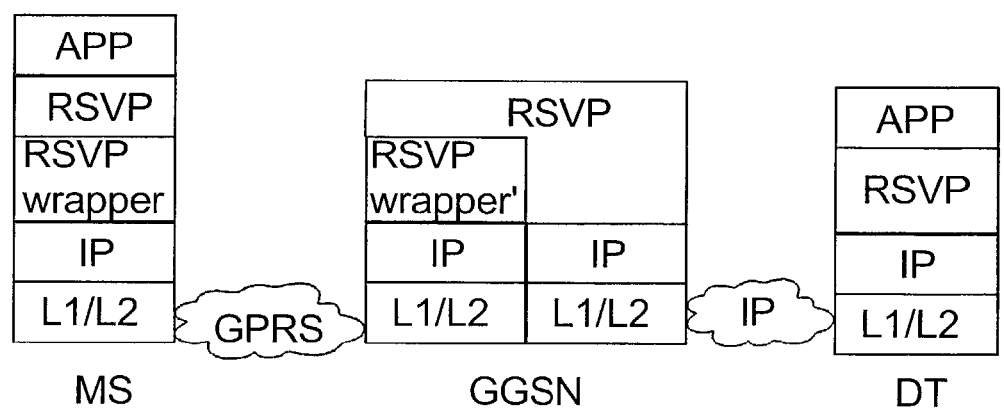
FIG. 2 illustrates protocol layers of a system according to a preferred embodiment of the invention.

Protocol layers of the system according to a preferred embodiment of the invention are illustrated in FIG. 2. Based on the application APP needs, the RSVP layer in the mobile station MS reserves and maintains QoS reservations by sending and receiving RSVP messages through an Internet Protocol IP layer and GPRS layers L1/L2 to an RSVP service node in the GPRS, which is advantageously GGSN. The GGSN comprises layers 1 and 2 L1/L2 and an IP layer to communicate with GPRS network elements, mobile stations (MS) and, on the other side, with nodes in the Internet. IPv4 or IPv6 may be used. The RSVP layer takes care that RSVP messages are sent to/from the mobile station MS and to/from a data terminal DT in the Internet. The mobile station MS comprises a new functionality referred to as an RSVP wrapper in the mobile station MS, and the GGSN comprises an RSVP Wrapper' which is a counterpart of the RSVP Wrapper. The RSVP wrapper and the RSVP wrapper' drop the PATH or RESV messages (to be transferred over the GPRS network) when necessary, thus reducing the traffic load over the air interface. However, they advantageously allow the transmission of other kinds of RSVP messages, such as path teardown PATHTEAR and reservation teardown RESVTEAR messages used to remove QoS reservations. The RSVP wrapper takes care that the appropriate PATH or RESV messages are transferred to the RSVP layer of the MS periodically, and the RSVP Wrapper' takes care that the appropriate PATH or RESV messages are transferred to the RSVP layer of the data terminal DT periodically.

Figure 3:
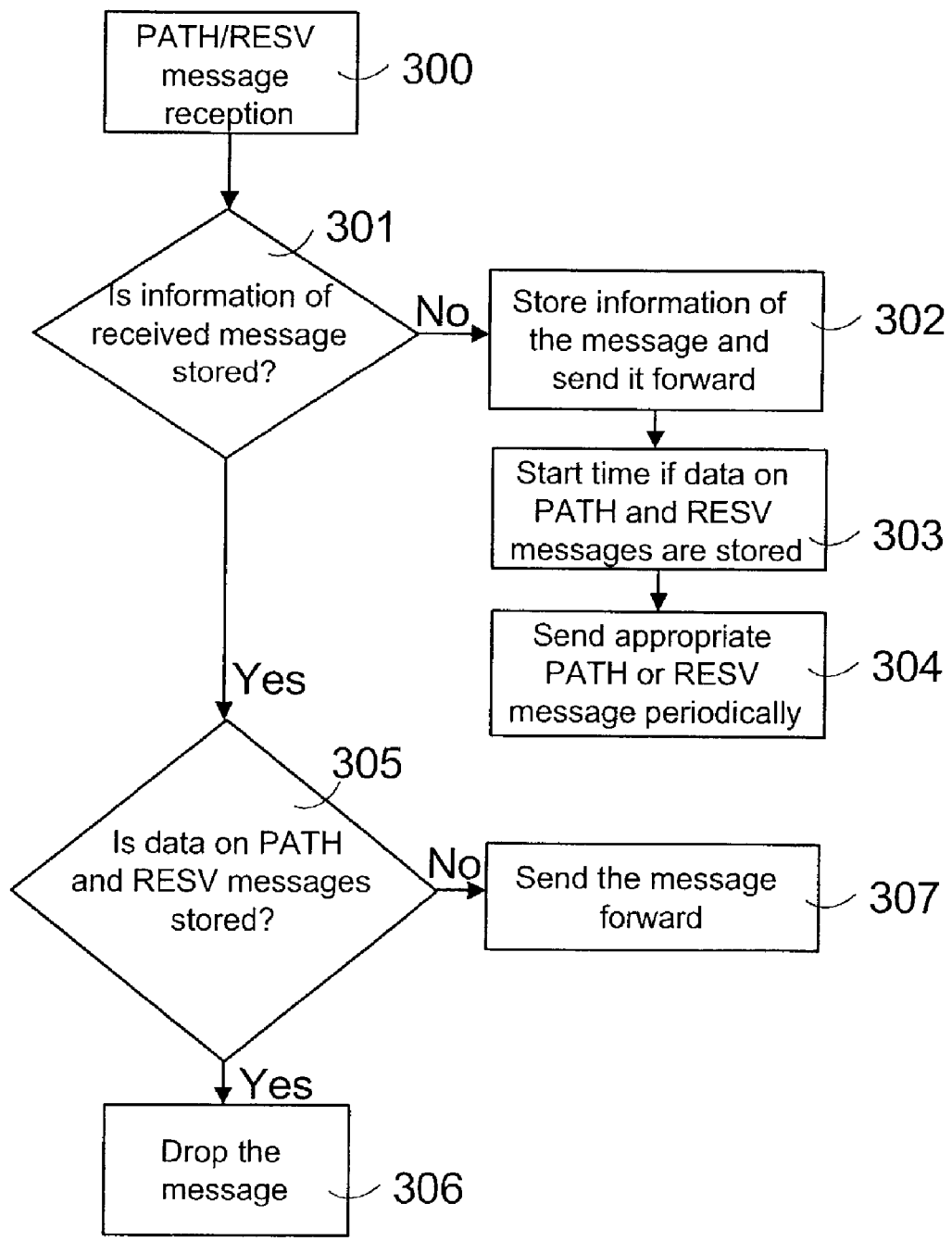
FIG. 3 is a flowchart illustrating the functionality according to a preferred embodiment of the invention.

As described above, PATH and RESV messages are transmitted periodically, in accordance with RSVP, between RSVP QoS protocol entities of parties involved in the reservation. Reference is made to FIG. 3, which is a flowchart illustrating functionality according to a preferred embodiment of the invention. The functionality shown in FIG. 3 can be applied in an RSVP wrapper of a mobile station MS and in an RSVP wrapper' of a support node GGSN. When a PATH or RESV message is received 300, it is checked whether data on a similar message related to the same reservation is already stored 301. If data on a similar message is not stored, at least the data on the received message is stored, whereafter the message is forwarded 302. If data on PATH and RESV messages corresponding to one another and related to the same reservation is then stored, a timer is preferably activated 303. A PATH or an RESV message is then forwarded periodically to the RSVP protocol entity 304. If data on a similar message is stored, it is checked whether data on PATH and RESV messages corresponding to one another and related to the same reservation is stored 305. For example, if the received message is an RESV message, it is checked whether data on a corresponding PATH message is stored. If data is stored on both a PATH and an RESV message, the received message is dropped or it is not forwarded 306. If there is no data stored on corresponding PATH and RESV messages, the message may be forwarded 307.

At least the basic data on the first PATH and RESV messages is stored in order to distinguish the messages from one another, i.e. at least data on the message type (PATH or RESV) and on the reservation (and flow) the message belongs to. According to an embodiment of the invention, the first PATH and RESV messages are stored as such, and the subsequent received messages can be compared directly with the stored messages. In the examples described in connection with FIGS. 4 and 5, the messages are stored as such.

It should be noted that the use of a timer is not the only possible manner of transmitting messages periodically. According to an embodiment of the invention, the mobile station or the support node GGSN which has dropped the message informs the support node GGSN or the mobile station of the need to transmit the message. This information can be transmitted for example in the form of a short signalling message over the GPRS network.

A mobile station or a support node according to a preferred embodiment of the invention comprises means to provide the above-described reception of messages, checking of messages, storing of message information, dropping of messages, sending of messages and timing of messages. They comprise processors and memory, which may be used to provide the inventive functionality.

Figure 4:
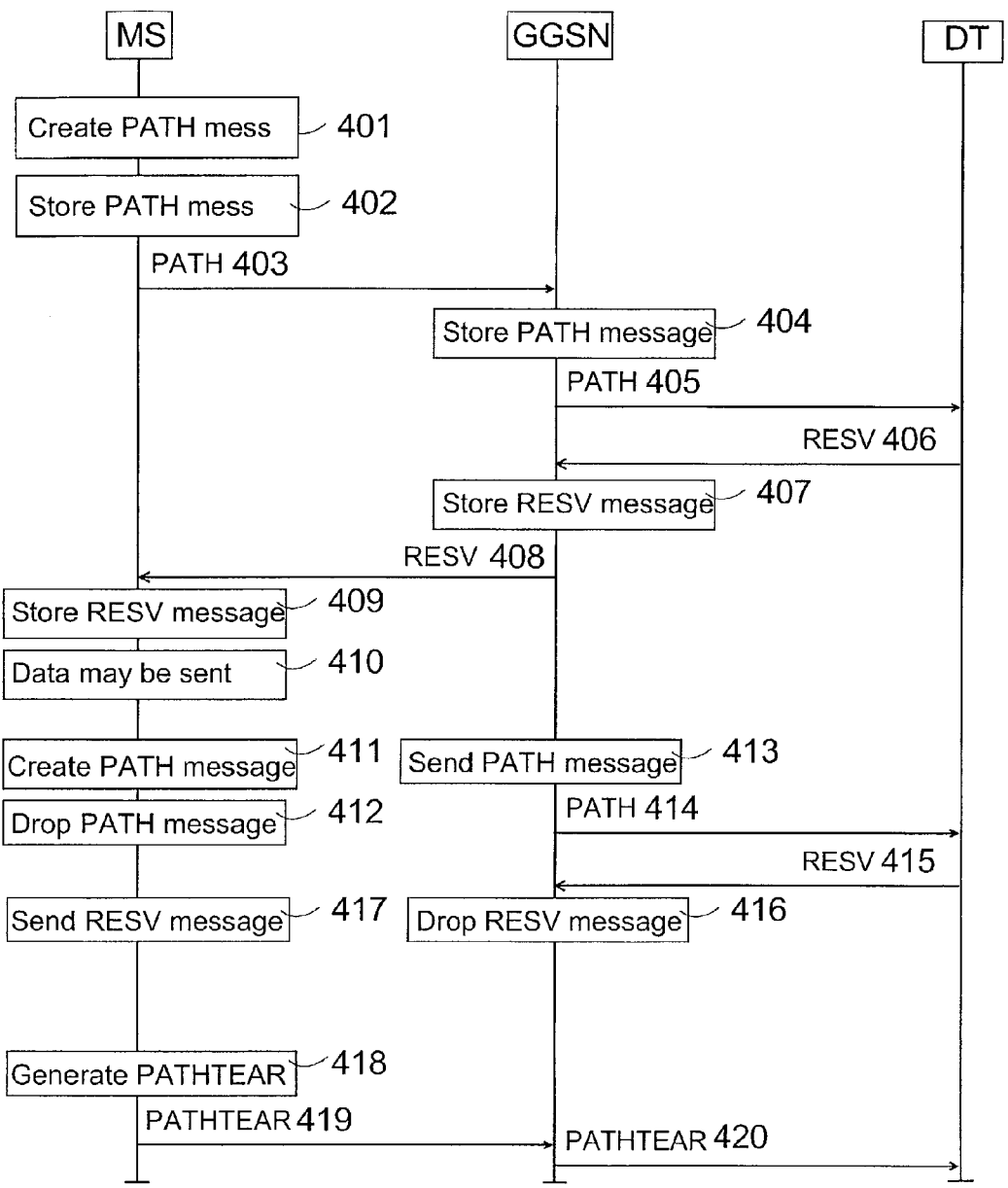
FIG. 4 illustrates mobile-originated quality of service reservation.

With reference to FIG. 4, a QoS reservation will be described, where a mobile station MS originates the reservation. The MS has an active PDP context, and the application APP requests a specific QoS level. The RSVP layer of the mobile station creates and sends an appropriate PATH message 401. The RSVP wrapper intercepts the PATH message and stores a copy of the message 402, whereafter the message is forwarded to the IP layer. The IP layer routes the message to the GGSN 403, which is, in the optimal case, the first router after the wireless network.

The RSVP Wrapper' in the GGSN intercepts the PATH message, stores a copy of the message 404 and forwards the message to the RSVP layer. The RSVP layer of the GGSN behaves according to the RSVP specification and sends the PATH message towards the next hop router 405, which is in this example the data terminal DT. Although not shown in FIG. 4 for the sake of clarity, there may be a plurality of nodes handling the RSVP process and reserving QoS. The DT receives the PATH messages and sends an RESV message to the GGSN 406.

When the RESV message is received in the support node GGSN, the RSVP layer acts according to the RSVP specification and sends the RESV message forward. The RSVP wrapper' of the GGSN intercepts the RESV message and finds out that the RESV message is a response to the PATH message stored earlier. The RSVP wrapper' stores a copy of the RESV message 407 and forwards the message to the mobile station MS 408. As PATH and RESV messages relating to the same flow are now stored, the RSVP wrapper' advantageously starts a timer.

The RSVP wrapper in the MS intercepts the RESV message and finds out that the RESV message is a response to the PATH message stored earlier. The RSVP wrapper stores a copy of the RESV message 409 and forwards the message to the RSVP layer. As PATH and RESV messages relating to the same flow are now stored, also the RSVP wrapper advantageously starts a timer. The end-to-end RSVP reservation for the connection is now established and the RSVP layer informs the application that it may start data transmission 410.

The RSVP PATH messages must be sent periodically according to used refreshment interval in order to maintain the end-to-end QoS reservations. The RSVP layer of the mobile station sends PATH messages 411, which the RSVP wrapper intercepts. If they match the PATH messages sent earlier, and the RESV message of the same flow is also stored, the wrapper drops the messages 412.

On the basis of the timer, the RSVP wrapper' in the GGSN maintains the RSVP reservation by sending required PATH messages to the RSVP layer periodically according to the parameters in the intercepted PATH and RESV messages 413. The RSVP layer of the GGSN acts according to the RSVP specification and sends a PATH message to the DT 414.

The DT sends an RESV message back to the GGSN 415, and the RSVP wrapper' drops the RESV message 416. The RSVP wrapper sends the RESV messages to the RSVP layer of the MS 417 on the basis of the timer activated by the RSVP wrapper.

RSVP "teardown" messages remove a path or reservation state and they are transferred advantageously immediately as soon as the application finishes. There are two types of RSVP teardown messages, PATHTEAR and RESVTEAR. A PATHTEAR message travels towards all receivers downstream from its point of initiation and deletes the path state, as well as all the dependent reservation states along the way. A RESVTEAR message deletes the reservation state and travels towards all senders upstream from its point of initiation. A PATHTEAR (RESVTEAR) message may be conceptualized as a reversed-sense PATH message (RESV message, respectively). RESVERR (reservation error) and PATHERR (path error) messages are used to report errors and are advantageously delivered over the GPRS network without being dropped.

In FIG. 4, a PATHTEAR message is generated by the RSVP layer 418. As the message is not a PATH or RESV message, the RSVP wrapper sends the message forward to the GGSN 419. Correspondingly, the PATHTEAR message is sent forward to the DT 420 and the path and reservation states are deleted.

It should be noted that the QoS reservation may be done only for uplink or downlink or in both directions. This depends on application needs, e.g. in a video call QoS reservation may be required in both directions, whereas in WWW browsing (World Wide Web) the QoS reservation may be required only for the downlink data.

Figure 5:
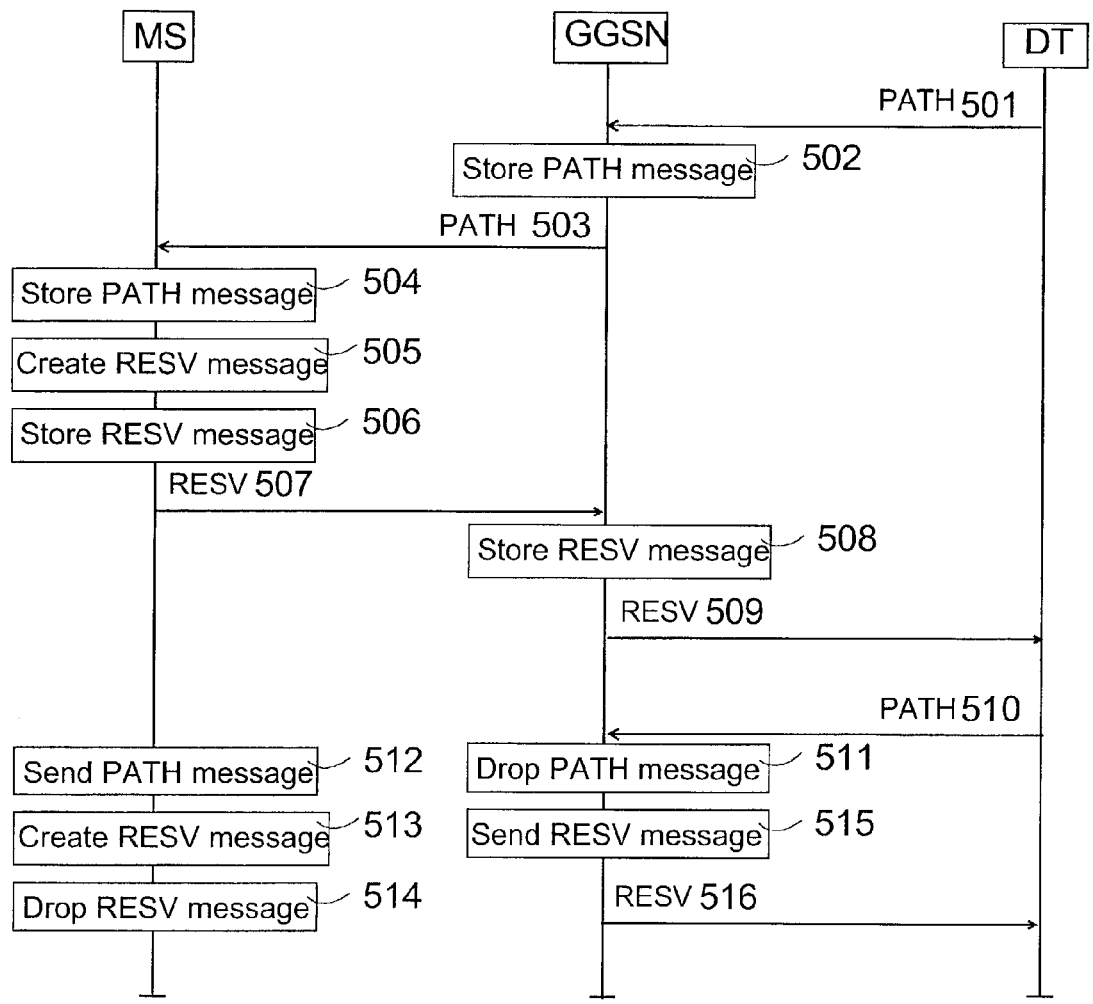
FIG. 5 illustrates quality of service reservation activated by a data terminal connected to the Internet.

FIG. 5 illustrates QoS reservation according to an embodiment of the invention where the data terminal DT initiates the reservation. The same mechanisms also apply to incoming QoS reservation requests (i.e. PATH messages); the roles of the RSVP wrapper and the RSVP wrapper' are just interchanged.

The RSVP layer of the DT creates and sends an appropriate PATH message towards the GGSN 501. The RSVP layer of the GGSN acts according to the RSVP specification and delivers the message forward. The RSVP wrapper' intercepts the PATH message and stores a copy of the message 502. The PATH message is sent to the MS 503. The RSVP wrapper in the MS intercepts the PATH message, stores a copy of the message 504 and forwards the message to the RSVP layer. The RSVP layer of the MS behaves according to the RSVP specification and creates an RESV message 505. The RSVP wrapper stores a copy of the generated RESV message 506 and sends the message forward to the GGSN 507. As PATH and RESV messages relating to the same flow are now stored, the RSVP wrapper advantageously starts a timer.

When the RESV message is received in the support node GGSN, the RSVP wrapper' intercepts the RESV message and finds out that the RESV message is a response to the PATH message stored earlier. The RSVP wrapper' stores a copy of the RESV message 508, whereafter the RSVP layer forwards the message to the DT 509. As PATH and RESV messages relating to the same flow are now stored, also the RSVP wrapper' advantageously starts a timer.

According to the RSVP, the DT sends PATH messages periodically 510. The RSVP wrapper' intercepts a PATH message and drops the message if it matches the PATH message stored earlier (and if the RESV message of the same flow is also stored) 511. On the basis of the timer the RSVP wrapper has activated, the RSVP wrapper sends a PATH message based on the stored PATH message to the RSVP layer 512. The RSVP layer creates an RESV message 513. The RSVP wrapper drops the RESV message if it matches the RESV message stored earlier and if the PATH message of the same flow is also stored 514.

On the basis of the timer activated in the RSVP wrapper' in the GGSN, the RSVP wrapper' maintains the RSVP reservation by sending required RESV messages to the RSVP layer periodically according to the parameters in the stored PATH and RESV messages 515. The RSVP layer of the GGSN acts according to the RSVP specification and sends a RESV message to the DT 516. In order to remove the QoS reservation, the RSVP layer in the DT or the MS may then send a PATHTEAR or RESVTEAR message, which is transferred over the interface between the MS and the GGSN (not shown).

The RSVP wrapper and the RSVP wrapper' know whether the MS or the DT has originated the reservation and thus know whether PATH or RESV messages need to be sent to the RSVP protocol entities. The transmission times of PATH/RESV messages advantageously determined by timers are also dependant of whether the MS or the DT has originated the reservation.

The mechanisms described above require only one PATH/RESV message pair to be sent over the air interface during the whole session, while the standard procedure would require typically several message pairs per minute. This saves considerably air interface resources.

The only modification to the existing systems is the insertion of the RSVP wrapper and the RSVP wrapper' functionality. The current RSVP implementations will work perfectly in the system according to a preferred embodiment of the invention.

The functionality of the invention described above can naturally also be used in other connections than the point-to-point connections described in the example above. For example in multicast transmissions, PATH and RESV messages related to connections between a mobile station and several different Internet hosts can be stored in the mobile station MS and in the serving support node GGSN. If the RSVP is utilized in a mobile-to-mobile connection, it is not necessary to always transmit PATH and RESV messages over the air interface of both wireless networks, as described above.

The invention can also be applied to other wireless telecommunication systems, particularly the UMTS, the core network of which is based on GSM/GPRS networks. The invention is also suitable for QoS reservation of IP-based applications operating on circuit-switched services, such as HSCSD (High Speed Circuit Switched Data), where the RSVP wrapper' functionality may be implemented e.g. in an access point to the Internet. The invention can also be applied to different wireless local area networks (WLAN).

It is obvious to those one skilled in the art that as technology advances, the inventive concept can be implemented in many different ways. Therefore the invention and its embodiments are not limited to the above examples but may vary within the scope and spirit of the appended claims.

The invention claimed is:

1. A method of reserving quality of service (QoS) in a wireless telecommunication system comprising at least one mobile station, a support node serving the mobile station, and a data terminal communicating with the mobile station, in which system quality of service is reserved and maintained by transmitting path messages and reservation messages between QoS protocol entities of the mobile station and the data terminal, the method comprising:

storing, in the mobile station and the support node, data at least on the first path and reservation messages to be transmitted between the mobile station and the data terminal when reserving quality of service, said first oath and reservation messages being stored as such, dropping, on the basis of said stored data, the next messages corresponding to said first path and reservation messages to be transmitted between the mobile station and the data terminal, and transmitting messages corresponding to said first path and reservation messages periodically to the QoS protocol entities of the mobile station and the data terminal on the basis of said stored first path and reservation message.

2. A method according to claim 1, wherein
a timer is activated in response to receiving said first path and reservation messages in the mobile station and/or the support node, and
messages corresponding to said first path and reservation messages are transmitted periodically to the QoS protocol entities of the mobile station and the data terminal on the basis of the timer.

3. A method according to claim 1, wherein messages related to cancelling the quality of service reservation and to error situations are transmitted between a mobile station and a data terminal, even if path and reservation messages were dropped.

4. A method according to claim 3, further comprising: eliminating said stored data from the memory in response to cancelling the quality of service reservation between the mobile station and the data terminal.

5. A method according to claim 1, wherein quality of service is reserved in accordance with RSVP, and that the path messages are PATH messages and the reservation messages are RESV messages.

6. A method according to claim 1, wherein the mobile station supports general packet radio service (GPRS), and the support node is a GPRS gateway support node (GGSN).

7. A wireless telecommunication system comprising at least one mobile station, a support node serving the mobile station, and a data terminal communicating with the mobile station, in which system quality of service is reserved and maintained by transmitting path messages and reservation messages between QoS protocol entities of the mobile station and the data terminal, wherein
the mobile station and the support node are configured to store data at least on the first path and reservation messages to be transmitted between the mobile station and the data terminal when quality of service is being reserved, said first path and reservation messages being stored as such,
the mobile station and the support node are configured to drop, on the basis of said stored data, the next messages corresponding to said first path and reservation messages to be transmitted between the mobile station and the data terminal, and
the mobile station and the support node are configured to transmit messages corresponding to said first path and reservation messages periodically to the QoS protocol entities of the mobile station and the data terminal on the basis of said stored first path and reservation messages.

8. A wireless telecommunication system according to claim 7, wherein
the mobile station and the support node are configured to activate a timer in response to receiving said first path messages and reservation messages in the mobile station and/or the support node, and
the mobile station and the support node are configured to transmit the next messages corresponding to said first path and reservation messages periodically to the QoS protocol entities on the basis of the timer.

9. A wireless telecommunication system according to claim 7, wherein
the mobile station and the support node are configured to transmit messages related to cancelling the quality of service reservation and to error situations between the mobile station and the data terminal, even if path and reservation messages were dropped.

10. A mobile station comprising a QoS protocol entity configured to send and receive path and reservation messages transmitted in order to reserve and maintain quality of service, wherein
the mobile station is configured to store data at least on first path and reservation messages transmitted in order to reserve quality of service, the mobile station being configured to store said first path and reservation messages as such
the mobile station is configured to compare next path and reservation messages with said stored data,
the mobile station is configured to block transmission of next path and reservation messages over the radio interface if they correspond said stored first path and reservation messages, and
the mobile station is configured to transmit messages corresponding to said first path and reservation messages periodically to the QoS protocol entity on the basis of said stored first path and reservation messages.

11. A support node in a wireless telecommunication system, wherein the support node configured to transmit path messages and reservation message in order to reserve and maintain quality of service between a mobile station and a data terminal,
the support node is configured to store data at least on first received path and reservation messages, the support node being configured to store said first path and reservation messages as such,
the support node is configured to compare next received path and reservation messages with said stored data,
the support node is configured to block the transmission of next received path and reservation messages over the radio interface if they correspond said stored first path and reservation messages, and
the support node is configured to transmit messages corresponding to said first path and reservation messages periodically to a QoS protocol entity of the data terminal on the basis of said stored first path and reservation messagess.

12. A support node according to claim 11, wherein the support node is a GPRS gateway support node (GGSN) in a GPRS network.

* * * * *